United States Patent
Kim

(10) Patent No.: US 7,055,066 B2
(45) Date of Patent: May 30, 2006

(54) LOADING ERROR RESTORING APPARATUS AND METHOD OF EXCHANGE

(75) Inventor: Tae Yong Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 808 days.

(21) Appl. No.: 09/984,412

(22) Filed: Oct. 30, 2001

(65) Prior Publication Data

US 2002/0053074 A1    May 2, 2002

(30) Foreign Application Priority Data

Oct. 30, 2000    (KR) ............................... 2000-63979

(51) Int. Cl.
*G06F 11/00*    (2006.01)
(52) U.S. Cl. ........................ 714/38; 717/173
(58) Field of Classification Search ................ 714/38; 717/173
See application file for complete search history.

(56) References Cited

U.S. PATENT DOCUMENTS

| | | | | |
|---|---|---|---|---|
| 5,421,006 A | * | 5/1995 | Jablon et al. ................. | 714/36 |
| 5,999,740 A | * | 12/1999 | Rowley ....................... | 717/173 |
| 6,314,532 B1 | * | 11/2001 | Daudelin et al. ............. | 714/38 |
| 6,377,974 B1 | * | 4/2002 | Feigenbaum ................. | 709/203 |
| 6,651,188 B1 | * | 11/2003 | Harding et al. ............... | 714/38 |
| 6,757,837 B1 | * | 6/2004 | Platt et al. .................... | 714/4 |
| 6,785,848 B1 | * | 8/2004 | Glerum et al. ................ | 714/38 |
| 6,789,215 B1 | * | 9/2004 | Rupp et al. ................... | 714/38 |

OTHER PUBLICATIONS

W. Richard Stevens, TCP/IP Illustrated, vol. 1 The Protocols, 1994, Addison-Wesley, p. 1.*

* cited by examiner

*Primary Examiner*—Robert Beausoliel
*Assistant Examiner*—Michael Maskulinski
(74) *Attorney, Agent, or Firm*—Fleshner & Kim, LLP

(57) ABSTRACT

A loading error restoring apparatus and method of an exchange are disclosed. A client processor loads a specific program related to a switching system and checks whether a loading error occurs more than a predetermined number of times in the loading process. If so, the client processor transmits a load request signal identifying a requested program to a loading server. In response, the loading server transmits a load reply signal containing the requested program, if it is available. Thereafter, the client processor checks whether the requested program exists in the transmitted load reply signal and loads the transmitted program to an associated disk and memory if the requested program exists.

30 Claims, 6 Drawing Sheets

FIG. 5A

| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
|---|---|---|---|---|---|---|---|---|---|---|---|---|---|---|---|---|---|---|---|---|---|---|---|
| PACKET TYPE=1 | | | | | | | | RESERVED | | | | | | | | SYSTEM TYPE | | | | | | | |
| RESERVED | | | | | | | | | | | | | | | | | | | | | | | |
| PROGRAM NAME | | | | | | | | | | | | | | | | | | | | | | | |
| PROGRAM VERSION | | | | | | | | | | | | | | | | | | | | | | | |

FIG. 5B

| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
|---|---|---|---|---|---|---|---|---|---|---|---|---|---|---|---|---|---|---|---|---|---|---|---|
| PACKET TYPE=2 | | | | | | | | TOTAL SIZE(BYTE) | | | | | | | | SYSTEM TYPE | | | | | | | |
| PROGRAM NAME | | | | | | | | | | | | | | | | | | | | | | | |
| PROGRAM VERSION | | | | | | | | | | | | | | | | | | | | | | | |
| PROGRAM DATA | | | | | | | | | | | | | | | | | | | | | | | |

LOADING ERROR RESTORING APPARATUS AND METHOD OF EXCHANGE

BACKGROUND OF THE INVENTION

1. Field of the Invention

The present invention relates to a loading system of an exchange and, more particularly, to a loading error restoring apparatus and method of an exchange.

2. Background of the Related Art

In general, in order to initialize a system or perform a specific operation, the exchange initiates a loading system to load a required program (or a file) from a storing unit thereof and execute it.

FIG. 1 illustrates a loading system of an exchange in accordance with a related art. The loading system of the related art exchange includes a storing unit 110 (referred to as a 'disk', hereinafter) for storing a pertinent program (or a file) and a main processor 140. The main processor 140 includes a memory 130 that provides a space for executing a loaded program and a loader 120 that controls an operation of loading the program stored on the disk 110 to the memory 130.

FIG. 2 is a flow chart of a loading error restoration process of the exchange in accordance with the related art. The loading error restoration process of the related art exchange will now be described with reference to FIGS. 1 and 2.

In order to perform a program loading, the loader 120 reads header information of a file to be loaded (step S10). When the file is read normally through the header information, the loader 120 writes the file in the memory (steps S20, S30).

When the file is written normally in the memory 130 after going through the processes (steps S10~S30), the loader 120 checks whether there are more files to be loaded (step S50). If there are more files to be loaded, the processes (S10~S40) are repeatedly performed. If, however, every file has been loaded, the loading system stops its operation.

However, if a corresponding file does not exist in step S20 or if the file has not been written normally into the memory 130 in step S40, the loader 120 analyzes a cause of the loading error (steps S60, S70). According to the analysis, if (1) the corresponding file does not exist on the disk 110, (2) the memory is short of space for writing the file, or (3) a loading error occurs more than three times for other reasons (step S80), the loader 120 stores the corresponding loading error information on the disk 110 and terminates the operation of the loading system. However, if the loading error is a temporary one, that is, if it has been generated due to an overload of the disk 110 or if it has been generated just because a text or a data header region of a file is erroneously written, the loader 120 renders the program to be loaded normally by repeatedly performing the loading process.

As mentioned above, when the loading error occurs, the related art loading system just stores the error occurrence status information on the disk 110 or repeatedly performs the loading process. The loading system has no hardware or software device to restore the cause of the error.

Therefore, a service of the exchange is suspended until an operator checks the load error through an operating terminal, duplicates the file anew or restores the damaged file.

SUMMARY OF THE INVENTION

An object of the invention is to solve at least the above problems and/or disadvantages and to provide at least the advantages described hereinafter.

Therefore, an object of the present invention is to provide a loading error restoring apparatus and method of an exchange that is capable of restoring a loading error.

Another object of the invention is to restore a loading error using a loading server connected to an exchange through the Internet.

To achieve the above objects in whole or in part, there is provided a loading error restoring apparatus of an exchange having a disk 210 for storing various programs and files used in an exchange, a memory 230, a client 220 for controlling a program loading operation from the disk to the memory and requesting a program with an error from an external server when a loading error occurs from a specific program, an Internet network 260, and a loading server 250 for transmitting a requested program through the Internet 260.

To further achieve the above objects in whole or in part, there is further provided a loading error restoring method of an exchange. The method includes loading a specific program related to a switching system; checking whether the loading error occurs more than a predetermined number of times in the loading process; transmitting a load request signal to a loading server if the loading error occurs more than a predetermined number of times; transmitting a load reply signal to the exchange in response to the loading request signal; checking whether a requested program exists in the transmitted load reply signal; and loading the transmitted program on the disk and the memory if the requested program exists.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5A illustrates an exemplary view of a program defined in an IP extension of a load request signal; and FIG. 5B illustrates an exemplary view of a program defined in an IP extension of a load reply signal.

DETAILED DESCRIPTION OF PREFERRED EMBODIMENTS

Figure 1:
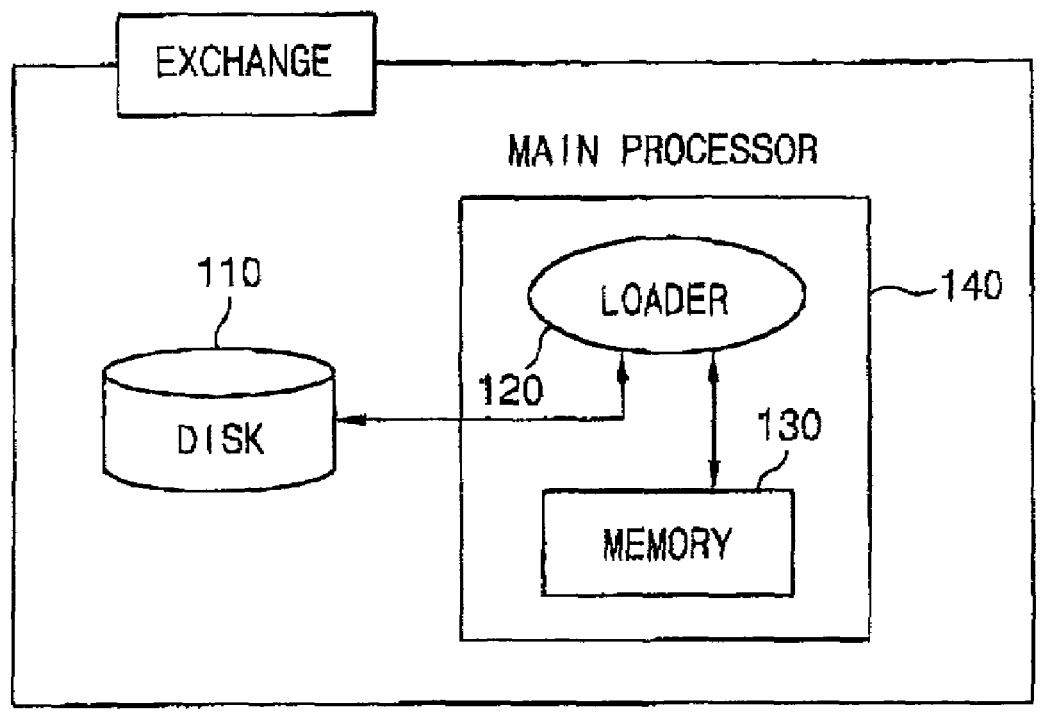
FIG. 1 illustrates a schematic view of a loading system in accordance with a related art.
Figure 2:
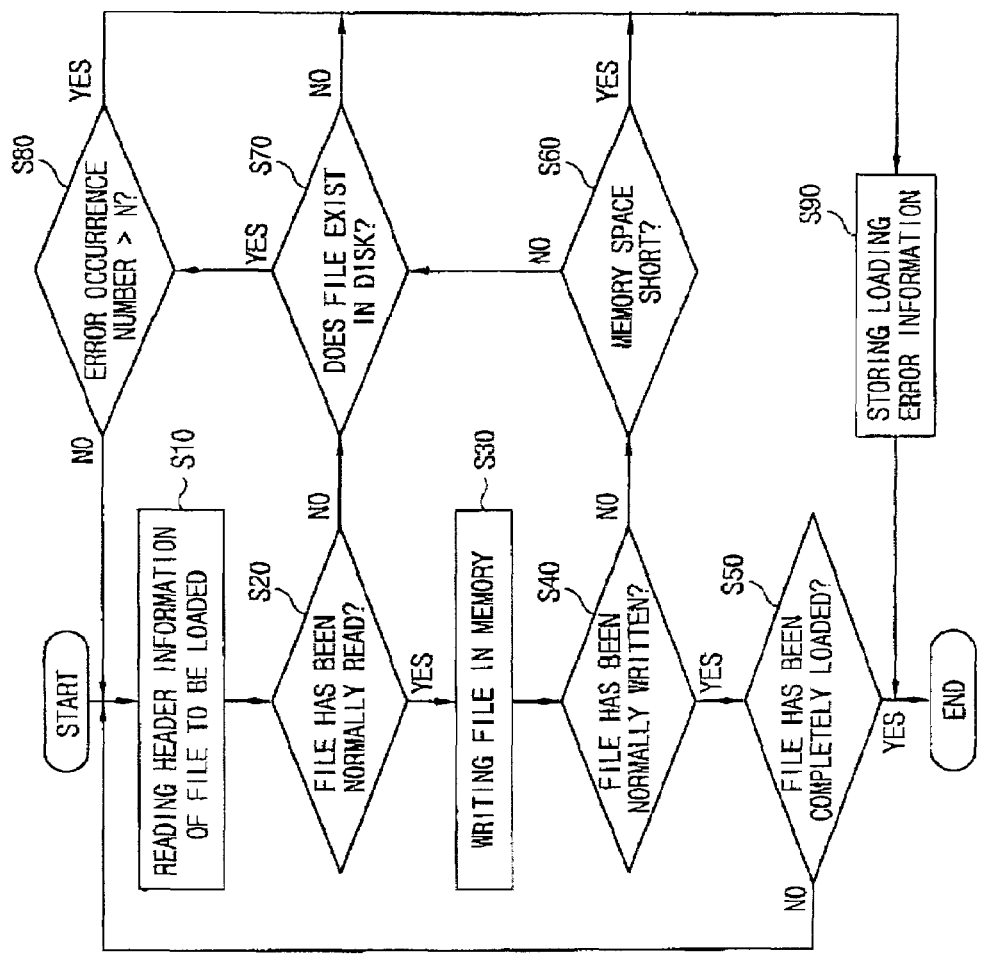
FIG. 2 illustrates a flow chart of a method for processing a loading error by the loading system in accordance with the related art.
Figure 3:
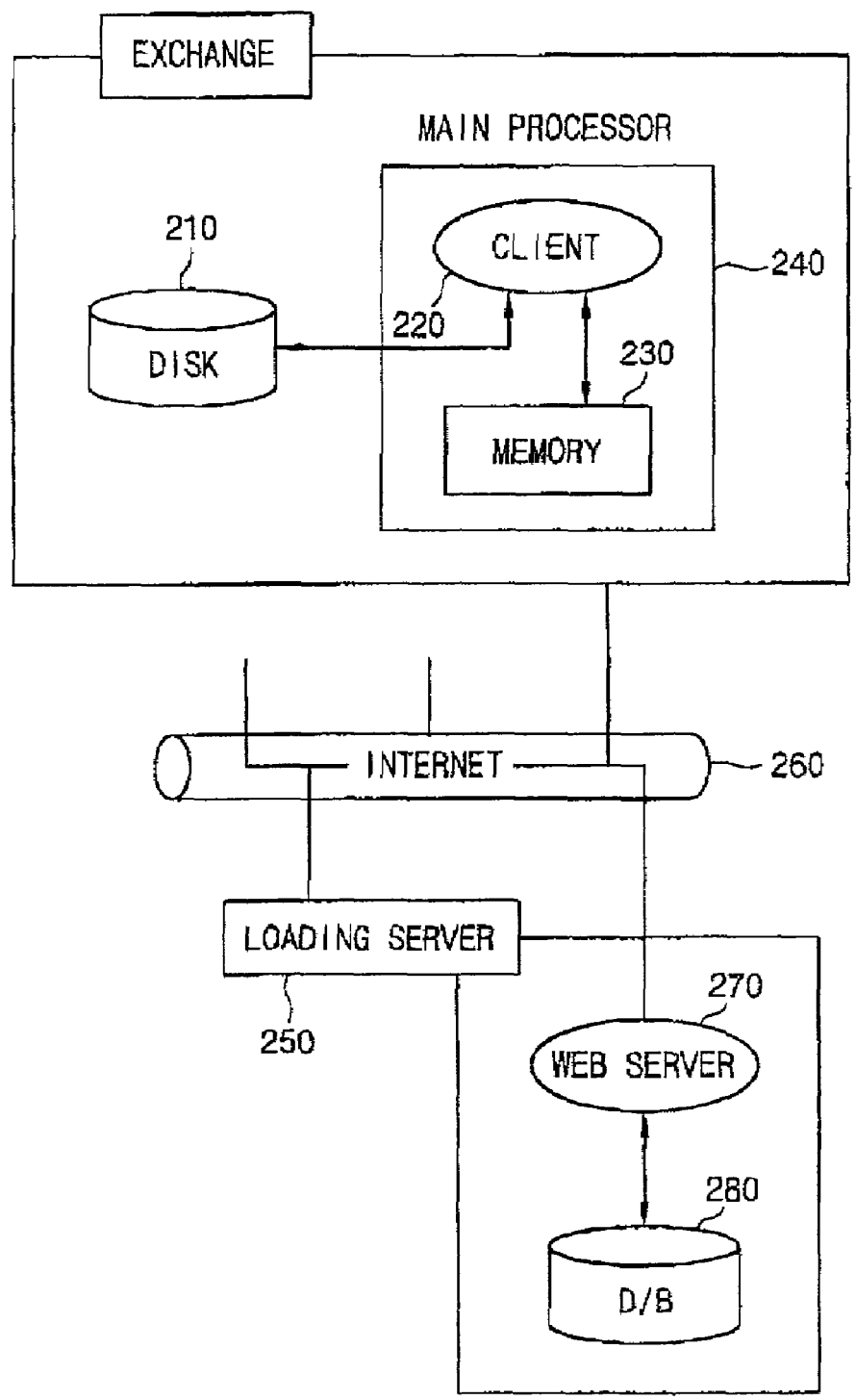
FIG. 3 illustrates a schematic view of a loading system in accordance with a preferred embodiment of the present invention.

FIG. 3 is a schematic view of a loading system in accordance with a preferred embodiment of the present invention. A loading error restoring apparatus of an exchange includes a disk 210, a main processor 240, the Internet 260 and a loading server 250 connected to the exchange through the Internet. The main processor 240 includes a client 220 and a memory 230. The loading server 250 includes a Web server 270 and a database 280. Elements of FIG. 3 will now be described.

The disk 210 stores various programs and files used in the exchange. The memory 230 provides a space for executing a loaded program. The client 220 controls a program loading operation from the disk to the memory and requests a program from the loading server when the loading error occurs with a specific program. The Internet 260 is a communication network for connecting the exchange and the loading server 250. The loading server 250 transmits a requested program to the client through the Internet. The exchange makes a Transmission Control Protocol/Internet Protocol (TCP/IP) based communication with the loading server 250. The Web server 270 analyzes the load request signal transmitted from the client 220, searches whether the requested program (or a file) is in the database 280, and provides the corresponding program. The database 280 stores the program and files used for various types of exchanges.

Figure 4A:
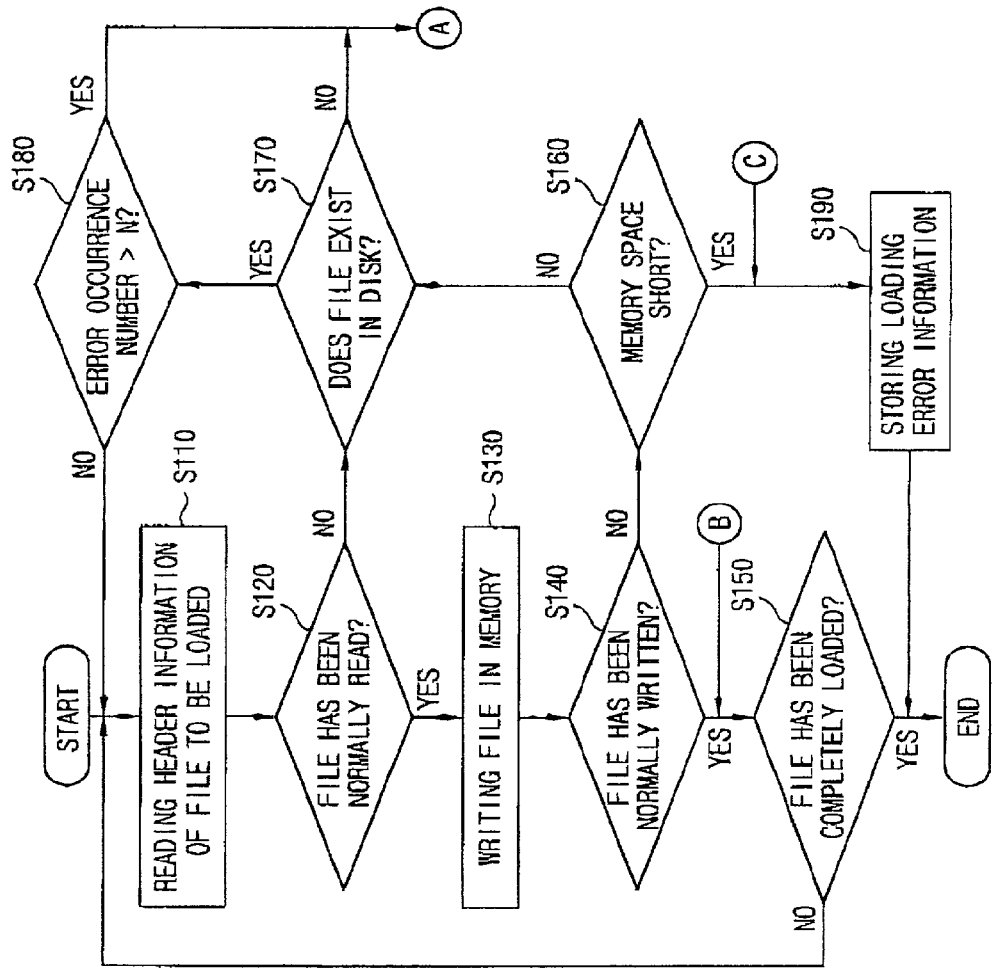
FIGS. 4A and 4B illustrate flow charts of a method for processing a loading error by the loading system in accordance with the preferred embodiment of the present invention.
Figure 4B:
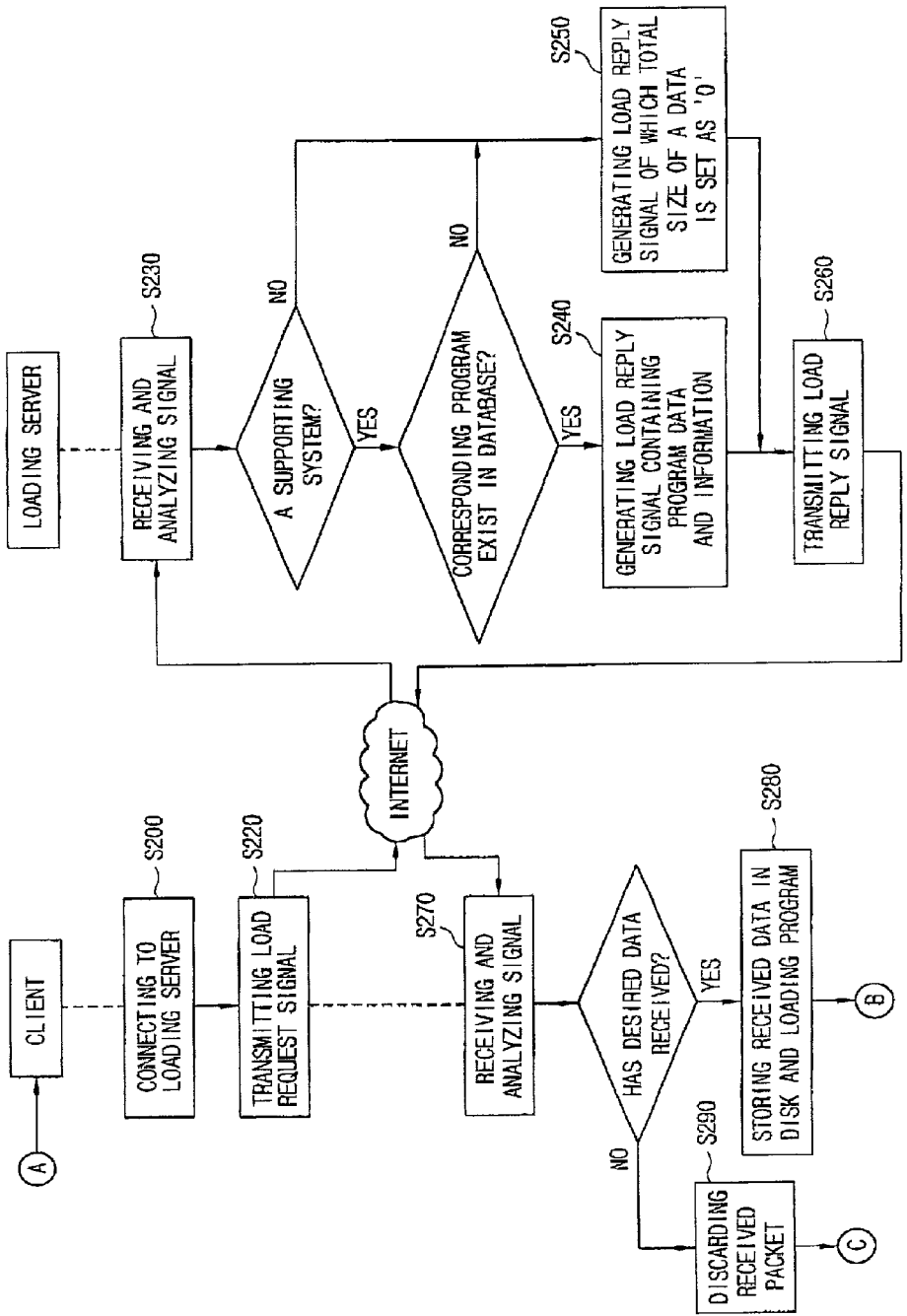

FIGS. 4A and 4B are flow charts of a method for processing a loading error by the loading system in accordance with the preferred embodiment of the present invention. A loading error restoring method of an exchange includes loading a particular program related to a switching system (steps S110~170); checking whether a loading error occurs more than a predetermined number of times during the loading (step S180); transmitting a load request signal to a loading server if the loading error occurs more than the predetermined number of times (steps S200~S220); transmitting a load reply signal to an exchange in response to the loading request signal (steps S230~S260); checking whether a requested program exists in the transmitted load reply signal (step S270); and loading the transmitted program onto the disk and into the memory if the requested program exists in the transmitted load reply signal (step S280). If a file intended to be loaded does not exist or has been damaged (step S1570), the load request signal is similarly transmitted to the loading server (steps S200~S220).

The loading error processing procedure will now be described in detail with reference to FIGS. 3, 4A, and 4B. The program loading process (steps S110~S170), which is performed before the loading error occurs more than a predetermined number of times, is similar to that of the related art. However, if the loading error occurs more than the predetermined number of times, unlike in the related art in which the loading error information is stored on the disk 110, the loading system of the present invention is connected to the loading server 250 through the Internet and downloads the same program (or the same file) as the program causing the error. That is, if the loading error occurs mote than a predetermined number of times (step S180) or if a file to be loaded does not exist (step S170), the loading system determines that it is not capable of restoring the loading error alone and downloads the same program from the external server 250.

First, the client 220 is connected to the loading server 250 through the Internet (step S200). If there is a designated loading server (250) identified in the client 220, the client 220 directly transmits a load request signal to the Internet address of the designated loading server 250. If, however, there is no designated loading server 250 identified in the client 220, the client 220 transmits the load request signal in a broadcast form.

The client 220 transmits the information of the program desired to be downloaded along with the loading request signal. The loading request signal and the loading reply signal transmitted between the client 220 and the server 250 include information on a type of the exchange, information on a program name and its version, information on a packet type, and program data. That is, in order to receive the same program (or the same file) as the program with the loading error, the client 220 transmits the information on the type of the exchange, information on the pertinent program name and its version, and information on a packet type (field value='1') together with the loading request signal to the server 250. The server 250 transmits program (or a file) data and total size information together with the loading reply signal to the client 220. The pieces of information are defined in an IP (Internet protocol) extension.

The IP extension is a part of the Internet protocol transmission standard that may be defined by a user, as shown in FIGS. 5A and 5B. FIG. 5A is an exemplary view of a program defined in an IP extension of a load request signal and FIG. 5B is an exemplary view of a program defined in an IP extension of a load reply signal.

After receiving the loading request signal, the server 250 checks a field value of the packet type. If the field value of the packet type is '1', the received signal is recognized as a loading request signal. And then, the IP extension of the received packet is analyzed to determine whether the exchange system associated with the client 220 is a type supported by the Web server 270 and whether the program (or a file) requested by the client 220 is stored in the database 280 (step S230). If the field value of the packet type is not '1', the received signal (packet) is discarded.

During the analysis process (step S230), if the server determines that it can provide the requested program to the client 220, the server 250 sets a field value of the packet type to '2', inputs a size of the corresponding program (or the file) into the total size field value, copies the field value for the type of the exchange, copies the program name and the version which have been received from the client 220 to the IP extension of the loading reply signal, and transmits the loading reply signal to the client 220 (step S240, S260). At this time, the server transmits the loading reply signal together with the program (or the file) data to be provided to the client 220.

However, during the analysis process (step S230), if the server 250 determines that it is not capable of providing a program to the client 220, that is, if the exchange system of the client 220 is not a supportable type or if the server 250 does not include a corresponding program (or a file), the server 250 transmits a loading reply signal, having a field value of the packet type set to '2' and a field value of the total size set to '0' byte, to the client 220 (steps S250, S260).

Upon receipt of the loading reply signal, the client 220 first checks the packet type. If the packet type is '2', the client 220 checks whether the field value of the total size is greater than '0' bytes and whether the type of the exchange identified in the loading reply signal is identical to the requested program name and version (step S270). If it is determined that the desired data has been received, the client 220 stores the received data on disk 210 and loads the corresponding program (or the file) into the memory (step S280).

And then, the client 220 checks whether there are more files to be loaded (step S150). If there are more files to be loaded, the processes (steps S110~S140) are repeatedly performed. If, however, every file has been loaded, the operation of the loading system is terminated.

During the analysis process (step S270), if the field value of the packet type is not '2', the client 220 discards the received signal (packet) (step S290). Moreover, even though the packet type is '2, if the total size is '0' bytes, the client 220 discards the received signal (packet) (step S290), stores the loading error information on the disk (210) (step S190), and completes the operation of the loading system.

As so far described, the loading error restoring apparatus and method of an exchange of the present invention has the following advantages. For example, even though a program loading is not properly performed because no file exists or a file is damaged, a required program (or a file) can be received from the loading server 250. Therefore, the program loading operation can proceed, so that the reliability of the loading system and the stability of the exchange can be remarkably improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A loading error restoring apparatus, comprising:
   an exchange that provides a prescribed switching function based on a program;
   a loading server that stores the program related to the exchange; and
   a network that communicatively couples the loading server and the exchange,
   wherein the exchange is configured to transmit a load request signal to the load server which includes program information related to a loading error, wherein the exchange requests a specific program selected from a plurality of general programs from the loading server in the load request signal, and to receive a non-erroneous version of the program from the loading server if the exchange determines that the loading error has occurred at least a predetermined number of times during a local loading of the program.

2. The apparatus of claim 1, wherein the exchange comprises:
   a disk that stores a number of files used in the exchange;
   a memory; and
   a client that controls a program loading operation from the disk to the memory and requests the program from an external server when the loading error occurs more than the predetermined number of times.

3. The apparatus of claim 1, wherein the exchange transmits the load request signal to the loading server and receives a load reply signal from the loading server through the network.

4. The apparatus of claim 3, wherein the program information of the load request signal comprises:
   a packet type;
   a type of the exchange;
   a program name; and
   information on a program version.

5. The apparatus of claim 3, wherein the load reply signal comprises:
   a packet type;
   a type of the exchange;
   a program name;
   a program version;
   information on a total size of the program; and
   the program data.

6. The apparatus of claim 3, wherein the exchange directly transmits the load request signal to the loading server if the loading server has been designated, and transmits the load request signal in a broadcast form if no loading server has been designated.

7. The apparatus of claim 1, wherein the network is an Internet network, and wherein the exchange is capable of making a TCP/IP-based communication through the network.

8. A loading error restoring apparatus, comprising:
   a disk that stores a program used in an exchange;
   a memory;
   a client that controls a program loading operation from the disk to the memory and transmits a load request signal which includes program information related to a loading error to an external server if the loading error occurs while loading the program; and
   a network that communicatively couples the external server, the client, and a loading server, wherein the external server has access to a plurality of general programs, and wherein the client selects a program from the plurality of general programs available through the load server, and the loading server transmits a requested program to the client through the network.

9. The apparatus of claim 8, wherein the client transmits a load request signal containing a type of the exchange, a program name, a program version, and a packet type to the loading server and receives a load reply signal containing a type of the exchange, the program name, the program version, the packet type, a total size of the program and the program data from the loading server.

10. The apparatus of claim 8, wherein the network is an Internet network, and wherein the client is capable of making a TCP/IP-based communication through the network.

11. The apparatus of claim 9, wherein the client directly transmits the load request signal to the loading server if the loading server has been designated, and transmits the load request signal in a broadcast form if no loading server has been designated.

12. A loading error restoring method, comprising:
   loading a specific program related to a switching system into an exchange;
   checking whether a loading error occurs more than a predetermined number of times in loading the specific program; and
   transmitting a load request signal which includes program information related to the loading error to a loading server and receiving a corresponding program from the loading server if the loading error occurs more than the predetermined number of times, comprising:
   transmitting a load request signal from the exchange to the loading server;
   transmitting a load reply signal from the loading server to the exchange in response to the load request signal;
   checking, with the exchange, whether the corresponding program exists in the transmitted load reply signal, and discarding the load reply signal, with the exchange, if a program total size value of the load reply signal is '0' bytes; and
   loading the corresponding program in a disk and in a memory of the exchange.

13. The method of claim 12, wherein checking for the loading error further comprises downloading the corresponding program from the loading server if the program does not exist or a file of the program has been damaged in the loading process.

14. The method of claim 12, wherein transmitting the load reply signal further comprises:
   analyzing the load request signal with the loading server to check whether the corresponding program requested in the load request signal exists in the loading server; and
   integrating the corresponding program into the load reply signal and transmitting the load reply signal to the exchange, if the requested program exists.

15. The method of claim 14, wherein analyzing the load request signal further comprises setting a program total size as '0' bytes if the exchange is not a supportable type or the corresponding program does not exist in a database of the loading server.

16. The method of claim 12, wherein the program information of the load request signal comprises:
   a packet type;
   a type of the exchange;
   a program name; and
   information on a program version.

17. The method of claim 12, wherein the load reply signal comprises:
   a packet type;
   a type of the exchange;
   a program name;
   a program version;
   information on a total size of the corresponding program; and
   program data.

18. The method of claim 12, wherein an Internet network communicatively couples the exchange and the loading server and the exchange is capable of making a TCP/IP-based communication through the Internet network.

19. A loading error restoring method, comprising:
   loading a specific program related to a switching system into an exchange;
   checking whether loading errors occur more than a predetermined number of times while loading the specific program;
   transmitting a load request signal from the exchange to a loading server which includes program information related to the loading errors if the loading errors occur more than the predetermined number of times;
   transmitting a load reply signal from the loading server to the exchange in response to the load request signal;
   checking, with the exchange, whether a requested program identified in the load request signal exists in the transmitted load reply signal;
   loading the requested program on a disk and in a memory of the exchange if the requested program exists; and
   communicating the requested program from a common database to the loading server for subsequent communication to the exchange, wherein the common database is accessible by multiple exchanges, through the loading server, and stores a plurality of generally used switching system programs.

20. The method of claim 19, wherein checking the loading errors further comprises transmitting the load request signal to the loading server if the specific program does not exist or is damaged in the loading process.

21. The method of claim 19, wherein transmitting the load reply signal further comprises:

analyzing the received load request signal with the loading server to check whether the requested program exists in the loading server; and
   integrating the requested program into the load reply signal and transmitting the load reply signal to the exchange, if the requested program exists.

22. The method of claim 21, wherein analyzing the load request signal further comprises setting a program total size within the load reply signal as '0' bytes if the exchange is not a supportable type or the requested program does not exist in a database of the loading server.

23. The method of claim 22, further comprising discarding the load reply signal if the program total size of the load reply signal is '0' bytes.

24. The method of claim 19, wherein the load request signal identifies a type of the exchange, information on a program name, a program version, and a packet type in an Internet protocol extension.

25. The method of claim 19, wherein the load reply signal comprises:
   a packet type;
   a type of the exchange;
   a program name;
   a program version;
   information on a total size of the requested program; and
   program data.

26. The method of claim 19, wherein the exchange is capable of making a TCP/IP-based communication to the loading server.

27. The method of claim 19, wherein the exchange directly transmits the load request signal to the loading server if the loading server has been designated and transmits the load request signal in a broadcast form if no loading server has been designated.

28. A loading error restoring apparatus, comprising:
   an exchange that provides a prescribed switching function based on a program;
   a loading server that stores the program related to the exchange; and
   a network that communicatively couples the loading server and the exchange,
   wherein the exchange is configured to transmit a load request signal to the load server which includes program information related to a loading error and to receive a non-erroneous version of the program from the loading server if the exchange determines that the loading error has occurred at least a predetermined number of times during a local loading of the program, wherein the exchange transmits the load request signal to the loading server and receives a load reply signal from the loading server through the network, and wherein the program information of the load request signal comprises:
   a packet type;
   a type of the exchange;
   a program name; and
   information on a program version.

29. A loading error restoring apparatus, comprising:
   an exchange that provides a prescribed switching function based on a program;
   a loading server that stores the program related to the exchange; and
   a network that communicatively couples the loading server and the exchange,
   wherein the exchange is configured to transmit a load request signal to the load server which includes program information related to a loading error and to receive a non-erroneous version of the program from the loading server if the exchange determines that the loading error has occurred at least a predetermined number of times during a local loading of the program, wherein the exchange transmits the load request signal to the loading server and receives a load reply signal from the loading server through the network, and wherein the load reply signal comprises:

a packet type;
a type of the exchange;
a program name;
a program version;
information on a total size of the program; and
the program data.

30. A loading error restoring method, comprising:

loading a specific program related to a switching system into an exchange;

checking whether loading errors occur more than a predetermined number of times while loading the specific program;

transmitting a load request signal from the exchange to a loading server which includes program information related to the loading errors if the loading errors occur more than the predetermined number of times;

transmitting a load reply signal from the loading server to the exchange in response to the load request signal;

checking, with the exchange, whether a requested program identified in the load request signal exists in the transmitted load reply signal; and loading the requested program on a disk and in a memory of the exchange if the requested program exists, wherein the exchange directly transmits the load request signal to the loading server if the loading server has been designated and transmits the load request signal in a broadcast form if no loading server has been designated.

* * * * *